(12) United States Patent
Mongan

(10) Patent No.: US 6,203,191 B1
(45) Date of Patent: Mar. 20, 2001

(54) METHOD OF JUNCTION TEMPERATURE DETERMINATION AND CONTROL UTILIZING HEAT FLOW

(75) Inventor: Ryan H. Mongan, San Carlos, CA (US)

(73) Assignee: Speculative Incorporated, Palo Alto, CA (US)

(*) Notice: Subject to any disclaimer, the term of this patent is extended or adjusted under 35 U.S.C. 154(b) by 0 days.

(21) Appl. No.: 09/181,695

(22) Filed: Oct. 28, 1998

(51) Int. Cl.[7] .......................... G01K 17/00; G01K 13/02; G01N 25/20

(52) U.S. Cl. .............................. 374/43; 374/29; 374/20; 374/39

(58) Field of Search ........................ 374/43, 44, 29, 374/39, 20; 307/117; 340/213 R, 598, 228 R; 361/103; 327/512

(56) References Cited

U.S. PATENT DOCUMENTS

| | | |
|---|---|---|
| 3,383,614 | 5/1968 | Emmons et al. . |
| 3,480,852 | 11/1969 | Hung . |
| 3,502,944 | 3/1970 | Squiers . |
| 3,521,167 | 7/1970 | Unemori et al. . |
| 3,622,849 | 11/1971 | Kelley, Jr. et al. ................ 73/342 |
| 3,651,379 | 3/1972 | Moisand et al. ................ 317/41 |
| 3,688,295 | 8/1972 | Tsoras et al. ................ 340/213 R |
| 3,906,310 | 9/1975 | Esashika ................ 317/33 R |
| 3,931,619 | 1/1976 | Moore et al. ................ 340/228 R |
| 4,001,649 | 1/1977 | Young ................ 317/41 |
| 4,039,928 | 8/1977 | Nofstker et al. ................ 323/19 |
| 4,117,527 | 9/1978 | Demarest et al. ................ 361/103 |
| 4,330,809 | 5/1982 | Stanley ................ 361/103 |
| 4,522,512 * | 6/1985 | Atkins ................ 374/44 |
| 4,669,025 | 5/1987 | Barker, III et al. ................ 361/103 |
| 4,689,659 | 8/1987 | Watanabe ................ 357/81 |
| 4,696,578 * | 9/1987 | Mansuria et al. ................ 374/45 |
| 4,734,641 * | 3/1988 | Byrd, Jr. et al. ................ 324/158 R |
| 4,823,290 | 4/1989 | Fasack et al. ................ 364/550 |

(List continued on next page.)

OTHER PUBLICATIONS

*General Electric Topical Report*, GEAP–20731, Jan. 1975, Muzzy, R.J. etal., "Determination of Transient Heat Transfer Coefficients and the Resultant Surface Heat Flux from Internal Temperature Measurements".

Alifanov, O.M., Tryanin, A.P., "Determination of the Coefficient of Internal Heat Exchange and the Effective Thermal Conductivity of a Porous Solid on the Basis of a Nonstationary Experiment" *Journal of Engineering Physics*, 1985, v. 48, N. 3, pp. 356–365.

Simbirskii, D.F., Gulei, A.B., "Optimally Planned Experimental–Computational Determination of Thermal Conductivity of Solids in Transient Heating Mode" *Journal of Engineering Physics*, '1983, v. 45, N. 5, pp. 1227–1231.

Primary Examiner—G. Bradley Bennett
Assistant Examiner—Gail Verbitsky
(74) Attorney, Agent, or Firm—Fish & Neave; Nicola A. Pisano

(57) ABSTRACT

A method and apparatus is provided for monitoring and controlling the temperature at the heat producing portion of an electrical current carrying device without direct measurement at the heat producing site. An integrated circuit 22 is thermally attached to a plurality of heat dissipating paths; top side heat conduction path 24, bottom side heat conduction path 26, and board level heat conduction path 28. On one of the heat conduction paths exists a heat flow sensor. This sensor is comprised of an inner thermistor 32 and an outer thermistor 34. The measured heat flow is combined with a single point temperature measurement and the thermal conductivity between the heat source and the temperature measurement point to produce the temperature at the heat source. This temperature is monitored in order to keep the temperature of the electrical current carrying device below critical levels or within a specified range.

24 Claims, 12 Drawing Sheets

U.S. PATENT DOCUMENTS

| | | | |
|---|---|---|---|
| 4,840,495 | * | 6/1989 | Bonnefoy ................................. 374/43 |
| 4,896,199 | | 1/1990 | Tsuzuki et al. ......................... 357/28 |
| 4,896,245 | | 1/1990 | Qualich .................................... 61/103 |
| 4,907,117 | | 3/1990 | Pease et al. ............................. 361/54 |
| 4,970,497 | | 11/1990 | Broadwater et al. ................. 340/598 |
| 5,008,736 | | 4/1991 | Davies et al. ........................... 357/75 |
| 5,119,265 | | 6/1992 | Qualich et al. ....................... 361/103 |
| 5,206,778 | | 4/1993 | Flynn et al. .......................... 361/103 |
| 5,230,055 | | 7/1993 | Katz et al. ............................ 395/750 |
| 5,230,074 | | 7/1993 | Canova, Jr. et al. ................. 395/750 |
| 5,245,510 | | 9/1993 | Honda .................................... 361/718 |
| 5,287,292 | | 2/1994 | Kenny et al. ......................... 364/550 |
| 5,291,607 | | 3/1994 | Ristic et al. .......................... 395/750 |
| 5,383,083 | | 1/1995 | Shinoda et al. ...................... 361/103 |
| 5,406,212 | | 4/1995 | Hashinaga et al. .................. 324/760 |
| 5,422,806 | | 6/1995 | Chen et al. ........................... 364/149 |
| 5,422,832 | | 6/1995 | Moyal ................................... 364/557 |
| 5,477,417 | | 12/1995 | Ohmori et al. ....................... 361/695 |
| 5,539,381 | | 7/1996 | Johnson ................................ 340/584 |
| 5,555,152 | | 9/1996 | Brauchle et al. ..................... 361/103 |
| 5,600,575 | | 2/1997 | Anticole ................................ 364/557 |
| 5,618,459 | | 4/1997 | Kamiya ................................. 219/497 |
| 5,639,163 | | 6/1997 | Davidson et al. .................... 374/178 |
| 5,664,201 | | 9/1997 | Ikedea ............................ 395/750.03 |
| 5,673,176 | | 9/1997 | Penniman et al. .................... 361/687 |
| 5,712,802 | | 1/1998 | Kumar et al. ......................... 364/557 |
| 5,726,603 | | 3/1998 | Chawla et al. ........................ 330/269 |
| 5,763,929 | | 6/1998 | Iwata .................................... 257/467 |
| 5,863,814 | * | 1/1999 | Alcoe et al. .......................... 438/117 |
| 5,940,784 | * | 8/1999 | El-Husayni ............................ 374/43 |
| 5,997,174 | * | 12/1999 | Wyland .................................. 374/43 |
| 6,039,471 | * | 3/2000 | Wyland .................................. 374/43 |
| 6,092,926 | * | 7/2000 | Still et al. ............................. 374/141 |
| 6,106,149 | * | 8/2000 | Smith ...................................... 374/31 |

\* cited by examiner

METHOD OF JUNCTION TEMPERATURE DETERMINATION AND CONTROL UTILIZING HEAT FLOW

FIELD OF THE INVENTION

The present invention relates to electrical current carrying devices. More specifically, the invention relates to semiconductor components such as diodes, transistors and microprocessors. More specifically, the invention relates to a temperature sensing method for remotely monitoring the junction temperature of a semiconductor component.

DEFINITIONS

Junction—A junction is an interface in a semiconductor device between regions with differing electrical characteristics. These characteristics determine the logic of the semiconductor device. The number of junctions per device can vary greatly. A diode may have a single junction while a microprocessor may have many millions of junctions. In the description and claims to follow, the use of the expression junction is intended to embrace both single and multiple junctions in semiconductor devices.

$T_j$ or junction temperature—The temperature of the substrate at the junction is often referred to in literature as $T_j$.

IHCP or Inverse Heat Conduction Problem—This is a method that has been employed during the last 30–40 years in thermal analysis to determine the surface temperature or surface heat flux from transient temperature measurements at one or more points inside the body of the part. It can also be used to determine the heat flux and temperature at the source of a self heating body such as a semiconductor device. This type of problem is one in which the solution does not depend directly on the measured data. Methods for solving this type of problem are described in the Publications section above.

BACKGROUND OF THE INVENTION

As is well known in the art, semiconductor devices are widely used in various electronic components and devices such as transistors, integrated circuits, lasers, and the like. It is also well known that the passage of current through a junction results in a certain amount of power loss and heat generation therein. Continuous operation or frequent activation with minimal off periods may result in elevating the junction temperature. This elevated temperature can cause two problems. First, some integrated circuit (IC) devices are susceptible to drift (e.g., lasers). A temperature that is a function of loading can be a source of drift that is difficult to predict. Second, many devices such as microprocessors have a high number of junctions per volume. This results in devices that have very high power densities and are susceptible to overheating. This overheating may result in the failure of the semiconductor to perform its assigned circuit function and may sometimes involve the destruction of the semiconductor device itself. It is therefore important to monitor the junction temperature and perform a control or alert function based upon the results.

Prior art has taught several different methods of determining the junction temperature of IC devices.

1. Temperature sensing directly on the die of the IC.
2. Recreation of the IC into a more thermally predictable device.
3. Pure computational methods (no sensing).
4. Single point temperature sensing remote to the die of the IC (e.g., on the package of the IC) followed by an extrapolation of the junction temperature.
5. Single point temperature sensing remote to the die of the IC (e.g., on the package of the IC) and a measurement of the ambient temperature prior to extrapolation of the junction temperature.

Sensing on the die itself is accomplished in a variety of different ways. Some proposals (e.g., U.S. Pat. No. 5,639,163-Davidson et al., U.S. Pat. No. 5,555,152-Brauchle et al., U.S. Pat. No. 5,422,832-Moyal, U.S. Pat. No. 5,291,607-Ristic et al., U.S. Pat. No. 3,383,614-Emmons et al., U.S. Pat. No. 4,896,199-Tsuzuki et al., U.S. Pat. No. 5,406,212-Hashinaga et al., and U.S. Pat. No. 5,206,778-Flynn et al.) include the use of a monolithically integrated environmental sensor. One typical implementation of this environmental sensor is a pair of on-chip thermally responsive diodes coupled to a remote current source. The diode pair generates differential voltage output proportional to temp. Other proposals (e.g., U.S. Pat. No. 4,896,245-Qualich, U.S. Pat. No. 3,521,167-Umermori et al., U.S. Pat. No. 4,970,497-Broadwater et al., and U.S. Pat. No. 4,039,928-Noftsker et al.) rely on the fact that the impedance of internal circuitry varies as a function of temperature. Similarly, these circuits are driven by an external source and the resulting voltage drop is correlated to junction temperature. Despite the theory, in practice, the output of these circuits varies from one manufactured on-chip circuit to another to an extent that calibration particular to each on-chip circuit is required. Differences in construction and operation between sensors and semiconductor devices such as microprocessors have led the semiconductor industry to shun their integration into the same substrate. In operation, most sensors generate analog signals that have been difficult to process in digital microprocessors. Interface circuits used to couple the analog sensor signal to a microprocessor require additional semiconductor devices and further discourage monolithic integration of sensors and microprocessors. In addition, the inclusion of a sensing circuit on an IC die naturally results in a larger die to be fabricated. The manufacturing yield of devices such as microprocessors is inversely proportional to die size. Thus, the inclusion of sensing circuits into an IC result in a circuit that is more difficult to manufacture. Another difficulty with this type of technique is that the solution must be designed into a particular device. Devices already in existence cannot be sensed with this technique since they do not have the sensor on the substrate. Even if sensors are monolithically integrated onto the substrate, some environments that those components go into may be thermally challenging while others may not. Even if the environment is not thermally challenging and no sensing or control is required, the purchaser of this device to be used in this environment is still burdened with the extra cost and size of these devices.

Squires (U.S. Pat. No. 3,502,944), Demarest et al. (U.S. Pat. No. 4,117,527), and Barker et al. (U.S. Pat. No. 4,669,025) teach methods for recreating or simulating the thermal condition of the IC in question into a different form. The goal with these techniques is to overcome the shortcomings of on-die measuring mentioned above. This simulated IC is monitored and the control circuit drives the actual IC in response to the thermal state of the simulated IC. In practice, this simulation is very difficult to achieve. The actual IC and the simulated IC cannot occupy the same space. Therefore, the simulated IC and the actual IC are operating in different environments. Often in electronic devices, the environment can vary greatly between chips that are even right next to each other. In addition, if a thermal solution (heat sink, heat pipe, heat spreader, peltier junction, etc.) is imposed upon the IC of interest, the same thermal solution must be imposed on the simulated IC. Besides generating additional cost and complexity, an identical thermal solution is difficult to achieve primarily because of thermal impedances across interfaces of different materials. In other words, an IC and a corresponding simulated IC can be attached to identical heat sinks. The surface roughness of the components and heat sinks at the interfaces can vary. In addition, the forces clamping the heat sink to the IC may not be identical to the forces clamping the heat sink to the simulated IC. These and other factors can contribute to thermal impedances that are not identical between the component in question and its simulation. These differences can be dramatically reflected in the output making the simulation inaccurate. Even if the simulation and the actual component are reasonably similar, the solution is still problematic as the simulation generates additional heat. Thus, the overall heat generated by the system is greater than the heat generated by the component itself. The total heat is a combination of the component and its simulated counterpart. This can have the adverse effect of overheating the component or other nearby components or devices.

Kenny et al. (U.S. Pat. No. 5,287,292) and Chen et al. (U.S. Pat. No. 5,422,806) teach a method of sensing and control that does not involve temperature sensing at all. These methods monitor how a device is driven during usage. In theory, by integrating this usage over time, a prediction can be made as to the current state of the junction temperature. In practice, it is very difficult to produce accurate results with an accumulated operating history because the local environmental conditions are not known. Even if the ambient conditions are well known at one point in time, they can change rapidly and dramatically. Condition changes of this type may include the sudden loss of system cooling capability, the unanticipated obstruction of the flow of device cooling medium, or the repositioning of the device. other changes over the life of the device may relate to the quality of the thermal impedances across interfaces. The thermal impedance of many thermal interface materials such as thermal greases decreases over the first few days of the life of a system. The impedances of these or other interfaces may increase over the life of a device because of handling. All of these changes can result in a device with an unknown or highly variable heat transfer capability.

The most common method of sensing and control currently in practice is the presence of a temperature sensor external to the die of the IC. Examples of this configuration can be seen in U.S. Pat. No. 5,664,201-Ikedea, U.S. Pat. No. 3,906,310-Esashika, U.S. Pat. No. 3,688.295-Tsoras et al., U.S. Pat. No. 4,001,649-Young, U.S. Pat. No. 4,330,809-Stanley, U.S. Pat. No. 4,689,659-Watanabe, U.S. Pat. No. 5,008,736-Davies et al., U.S. Pat. No. 5,119,265-Qualich et al., U.S. Pat. No. 5,230,055-Katz et al., U.S. Pat. No. 5,230,074-Canova et al., U.S. Pat. No. 5,345,510-Honda, U.S. Pat. No. 5,477,417-Ohmori et al., U.S. Pat. No. 5,600,575-Anticole, U.S. Pat. No. 5,618,459-Kamiya, U.S. Pat. No. 5,712,802-Kumar et al. and U.S. Pat. No. 5,763,929-Iwata. In these designs, a temperature is measured at a point X. A term commonly called $\theta_{JX}$ is utilized to convert this temperature to a junction temperature. The dimensions of $\theta_{JX}$ are Temperature/Power and the units commonly referenced in manufacturer's data sheets are ° C./Watt. Manufacturers of IC's often publish values for $\theta_{JX}$ where the X is replaced by C for case temperature and A for ambient temperature. The problem with this solution is that it assumes that all the heat flux from the component flows through the location X and the temperature of X is one definable temperature. For example, consider a component where the temperature measurement occurs on the case of the device. $\theta_{JX}$ is listed at 5° C./W and the power delivered to the device is measured at 10W. If the maximum junction temperature, $\theta_{JX}$, for this particular device is rated at 100° C., then the device will go over temperature when the case measures 50° C. This may be close to accurate if the vast majority of the heat flux travels through that particular portion of the case. This may be a reasonable assumption if, for example, a heat sink was also attached to the case and a fan passed cooling medium across the heat sink. However, consider if instead of being attached to the case, the heat sink device was attached to the backside of the printed circuit board (PCB) opposite the device. A large portion of the heat will be conducted through the PCB and passed to ambient via the heat sink instead of through the top case of the IC. In this situation, there will be a very small thermal gradient between the junction and the top case since the majority of the 10W are traveling the other direction. When the case reads 50° C., $T_j$ is actually not much higher that 50° C. Thus, $T_j$ would be dramatically overestimated in the later case compared to the former. Another problem with this solution is that the above inventions assume that $\theta_{JX}$ is known and does not change over time. In fact, $\theta_{JX}$ can change over time. The thermal impedances across interfaces may change over time due to handling or other environmental factors. Thermal greases and some interface materials used between devices and heat sinks actually decrease their thermal impedances over the first few days of their usage. In situations where X is the ambient temperature, $\theta_{JA}$ it is imperative that anywhere heat flux flows from the IC's thermal solution to ambient, the ambient temperature must be uniform. In practice, this is improbable. Orientation of the unit, neighboring heat producing components, cooling medium currents, external radiant energy (sunlight), etc., all contribute to making the ambient temperature a very complex function of space. Therefore, except in the most ideal conditions, $T_j$ will not be accurately estimated using this technique. In some cases, the cooling medium may be very uniform. Even in these cases, ambient measurements may not accurately predict device temperatures. For example, Kumar et al. teaches measuring of the air mass flow rate and temperature of a forced air system. Assumptions are made in that all the heat flux flows through the heat sink, which the measured air is passing over, and that the measured air properties are homogenous. These assumptions may not be reasonable as there may be other conductive, radiative and convective thermal dissipation paths present. In addition, the cooling efficiency of the heat sink may change over time. A buildup of dust, a blockage of the air, or a change to the thermal impedance properties of the interfaces material between the semiconductor device and the heat sink all contribute to a different thermal gradient between the measured point X and the junction temperature. None of these contributing factors will be indicated by the stated measurement of the air properties. Anticole teaches measuring the temperature remote, but close to, the device. Like many of the other inventions, Anticole assumes that the thermal resistance is known. The difficulties with this assumption are stated above. In addition, Anticole also assumes that the thermal time constant between the measurement point and the heat source is known. In this way, as the power delivered to the device is being monitored, the temperature at the source can be estimated more accurately and in a more timely manner during transient conditions. The difficultly is that the thermal time constants can also change over the life of a device. For example, assume that the thermal transfer material between the device and its primary thermal dissipation path decreases its thermal impedance over time. Because of this, the aggregate thermal conductivity of the system increases. As the thermal conductivity increases, the time constant decreases. In the Anticole invention, an overestimated time constant will result in an overestimated junction temperature.

Another technique that is taught is very similar to the external sensor technique above (e.g., U.S. Pat. No. 3,480, 852-Hung, U.S. Pat. No. 4,823,290-Fasack et al. and U.S. Pat. No. 3,651,379-Moisand et al.). Multiple sensors are used including at least one ambient temperature sensor. The output from these devices are compared against limits and a control circuit responds accordingly. The theory has it that this device can predict the junction temperature more accurately and more rapidly in transient situations than the solution that has a single sensor alone. In practice however, measuring the ambient at a point source only determines the ambient temperature at that particular point. As mentioned, in many electronic devices, ambient temperatures can vary radically from point to point. Only if the sensor were located in a statistically average point would this solution be able to accurately determine the junction temperature. Any location other than this ideal point would generate an overestimation or an underestimation of the junction temperature.

SUMMARY OF THE INVENTION

Accordingly, the objects of the present invention are:

to provide for an accurate and cost effective temperature sensing method for the junction temperature of semiconductor devices;

to provide a method of junction temperature sensing that is insensitive to the configuration or quality of the thermal solution;

to provide a method of junction temperature sensing that is insensitive to changes in the configuration or quality of the thermal solution throughout the life of the device;

to provide a method of junction temperature sensing that is compatible with existing components. These existing components may or may not have an integrated temperature sensor;

to provide a method of junction temperature sensing only where it is thermally necessary;

to provide a method of junction temperature sensing that is insensitive to changes in the environment surrounding the component or its thermal solution(s);

to provide a method of junction temperature sensing that can be an input to a control circuit used to regulate the same junction temperature;

to eliminate the burdening of the design and manufacture of a semiconductor device with an integrated temperature sensor; and to provide a signal relating to the heat flux through a particular thermal path. Changes to this value, relative to the total heat flux being dissipated, are evidence of the state of the thermal dissipation means.

The main advantage of the design shown herein is that it allows the junction temperature of electronic devices to be accurately determined from remote measurements. other related art that employs remote sensing for junction temperature measurement invariably results in inaccuracies. When these inaccuracies are overestimations, the device may be run slower or shut down earlier than need be. When these inaccuracies are underestimations, the device may not accurately perform its prescribed circuit function or runs the risk of permanent damage as the result of over-temperature. Thus, the present invention provides a monitoring and control technique that allows devices to run at their performance limit or to be accurately regulated while keeping their internal temperatures below critical levels. In addition, the junction temperature measurement and control can be achieved independent of the type or number of thermal solutions employed or the state of the surrounding environment.

One aspect of the present invention is a method by which the temperature of a heat producing portion of an electrical current carrying device is monitored by combining: the temperature at a point along a thermal dissipation path, the heat flux along the same thermal dissipation path between the heat producing portion and the temperature measurement point, and the aggregate thermal conductivity of the elements between the electrical current carrying device to the temperature measurement point. This monitoring makes thermal regulation of the electronic device possible.

Another aspect of the present invention is a method by which the temperature of a heat producing portion of an electrical current carrying device which also contains a plurality of thermal dissipation paths is monitored by combining: the temperature at a point along each thermal dissipation path, the aggregate thermal conductivity of the elements between the electrical current carrying device to each temperature measurement point, and the total power dissipated by the electrical current carrying device as heat. This monitoring makes thermal regulation of the electronic device possible.

Another aspect of the present invention is a method of monitoring the thermal dissipation state of an electronic system. This is achieved by monitoring the heat flux through a particular thermal dissipation path associated with an electrical current carrying device. This sensing makes thermal regulation of the electronic system possible. The heat flux through a particular thermal path relative to the total heat flux from the device is monitored. As this signal changes, its fluctuations can be evidence of a fault condition, an indication that one or more of the paths has changed its thermal transfer efficiency, or an indication that a thermal path has been disconnected or connected. For example, if the heat flux on a particular path increases as a percentage of the total heat flux of the system, this could be indicative of the loss of efficiency of one of the other thermal dissipation paths or the increase in efficiency of the measured path. Conversely, if the heat flux dropped as a percentage of the total heat flux, the efficiency of the monitored path could have diminished or another path could have been created or have been made more efficient.

Other objects and advantages of the present invention and a full understanding thereof may be had by referring to the following detailed description and claims taken together with the accompanying illustrations. The illustrations are described below in which like parts are given like reference numerals in each of the drawings.

BRIEF DESCRIPTION OF THE DRAWINGS

FIG. 2 is an exploded isometric view of the assembly shown in FIG. 1a.

FIG. 3a is a plan view of a portion of a test device used in conjunction with the assembly shown in FIG. 1a.

FIG. 5b is an exploded isometric view of the assembly shown in FIG. 5a.

FIG. 10b is an exploded isometric view of the assembly shown in FIG. 10a.

Figure 1A:
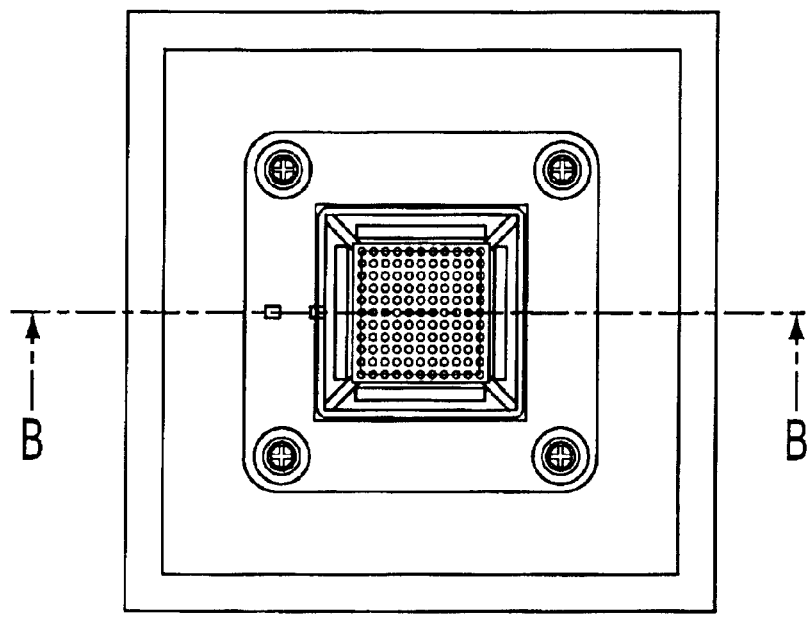
FIG. 1a is a plan view of a portion of an electronic device that contains a semiconductor device, its accompanying thermal solution, and the present invention's junction temperature monitoring means incorporated therein.
Figure 1B:
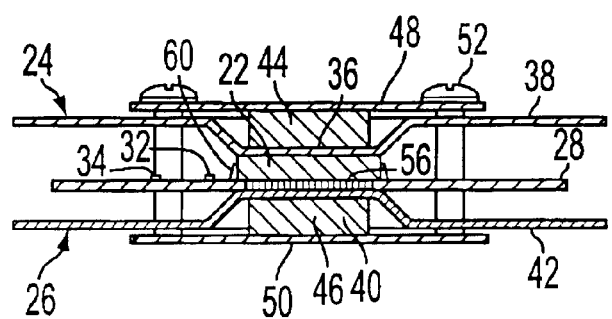
FIG. 1b is a cross section view of the devices shown in FIG. 1a with the section taken along line B—B.
Figure 2:
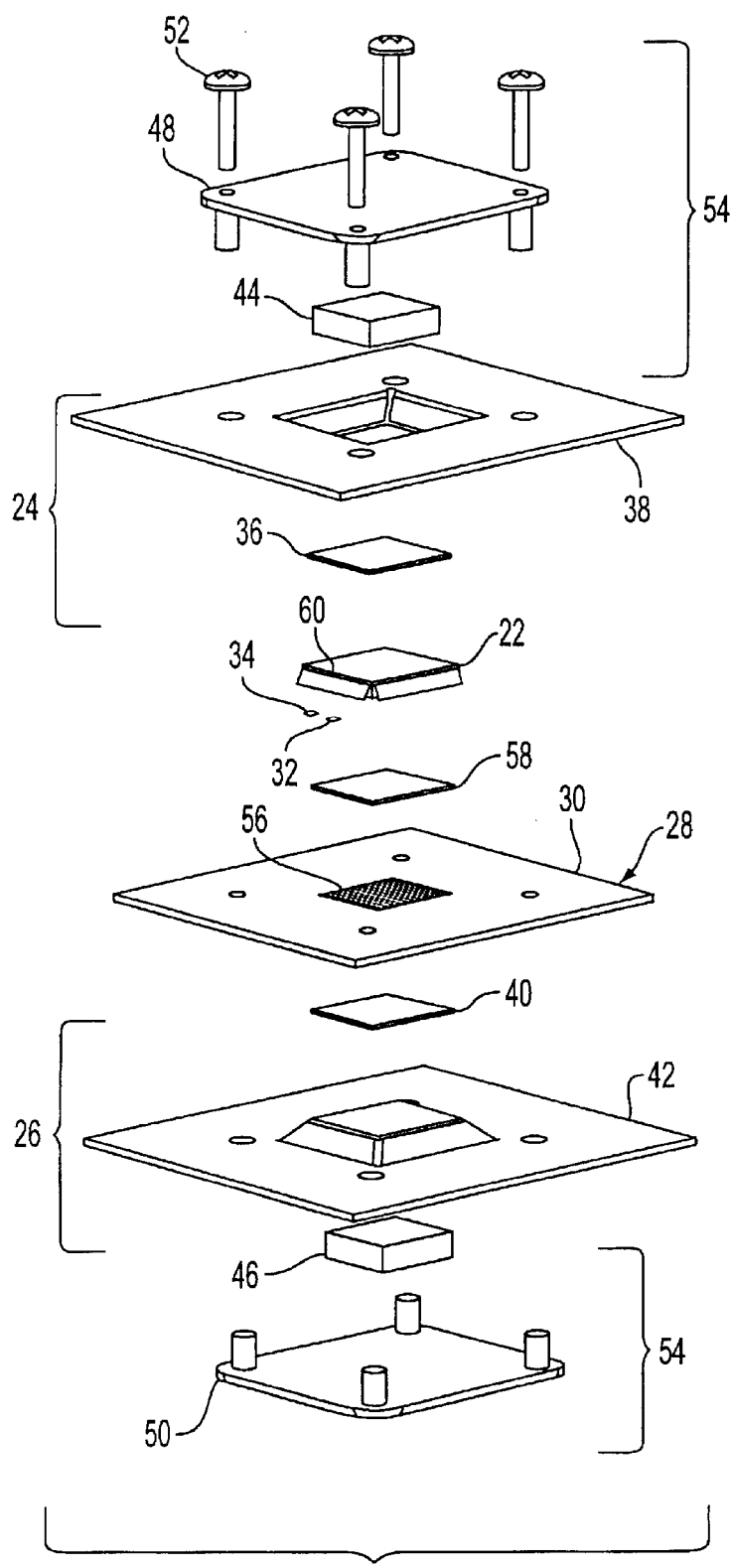

DESCRIPTION OF THE PREFERRED EMBODIMENT 22 integrated circuit
24 top side heat conduction path
26 bottom side heat conduction path
28 board level heat conduction path
30 PCB
32 inner thermistor
34 outer thermistor
36 upper thermally conductive conformal interface material
38 top heat spreader
40 lower thermally conductive conformal interface material
42 bottom heat spreader
44 upper foam spring
46 lower foam spring
48 upper retainer
50 lower retainer
52 retainer screws
54 clamping assembly
56 PCB thermal vias
58 die attach epoxy
60 integrated circuit leads
62 thermal test chip
64 thermal test chip leads
66 die/PCB thermal interface material
68 thermal test PCB
70 inner thermistor
72 outer thermistor
74 lower insulating material
76 upper insulating material
78 heat flow sensor
80 heat flow sensor connector
82 heat sink
84 heat sink clip
86 alternate PCB
88 clip retention holes
90 alternate PCB
92 radial heat flow sensor
94 PCB thermal vias
96 portable computer
98 portable computer dock
100 display module
102 base assembly
104 keyboard subassembly
106 touch sensitive pointing device
108 microprocessor module
110 heat moving subassembly
112 hard disk drive
114 media drive
116 input/output connectors
118 printed circuit board
120 PC Card connector
122 battery pack
124 thermal attachment plate
126 heat pipe
128 portable side thermal connector
130 base bottom housing
132 base top housing
134 inner thermistor
136 outer thermistor
138 thermistor electrical connector
140 alternate PCB
142 PCB connector
144 thermistor connector
146 thermistor
148 thermistor
150 thermistor leads
152 transistor
154 bolt
156 nut
158a,b heat sink post
160 heat sink Referring now to the drawings, particularly FIGS. 1a, 1b, and 2, a thermal solution incorporating the present invention is shown that may exist in a variety of applications. This particular incarnation is especially appropriate in portable computer applications where power densities are high and space is limited. An integrated circuit 22 is conductively coupled to a top side heat conduction path 24, a bottom side heat conduction path 26, and a board level heat conduction path 28. Each of these paths expels heat away from integrated circuit 22 regulating its temperature. Integrated circuit 22 is attached to a PCB 30 via a die attach epoxy 58 and a plurality of integrated circuit leads 60. Integrated circuit leads 60 are attached to integrated circuit 22 using, for example, solder reflow techniques. Die attach epoxy 58 can alternatively be replaced by solder. A series of PCB thermal vias 56 extend from one side of PCB 30 to the other. PCB thermal vias 56 are formed using plated-through-hole technology. One end of PCB thermal vias 56 is substantially flush to the surface of PCB 30 where it contacts die attach epoxy 58. As seen in FIG. 2, top side heat conduction path 24 generally includes an upper thermally conductive conformal interface material 36 and a top heat spreader 38. Upper thermally conductive conformal interface material 36 can be made of any thermally conductive conformal material, a suitable material being Parker Chomerics A274. Upper thermally conductive conformal interface material 36 is commonly available with pressure sensitive adhesive pre-mounted on one side. The adhesive can be attached to either side but it is commonly attached to the side contacting integrated circuit 22. Loaded against upper thermally conductive conformal interface material 36, top heat spreader 38 can be made of any high thermally conductive material, a suitable material being 1100-0 aluminum. Bottom side heat conduction path 26 generally includes a lower thermally conductive conformal interface material 40 and a bottom heat spreader 42. Lower thermally conductive conformal interface material 40 is similar to upper thermally conductive conformal interface material 36 and it is quite reasonable for these to be the same material. However, they are shown as two distinct items since it is common to vary the thickness of these two parts in order to tune the thermal solution. Lower thermally conductive conformal interface material 40 contacts PCB 30 where one end of PCB thermal vias 56 terminates. Loaded against lower thermally conductive conformal interface material 40 is a bottom heat spreader 42. Top heat spreader 38 and bottom heat spreader 42 also have the same role and they could ostensibly be the same material and thickness. In practice, this is often not the case because of space requirements and tuning of the thermal circuit. Loading top side heat conduction path 24 and bottom side heat conduction path 26 onto the heat generating area is a clamping assembly 54. Clamping assembly 54 is comprised of an upper retainer 48, a lower retainer 50, an upper foam spring 44, a lower foam spring 46 and a plurality of retainer screws 52. Upper retainer 48 and lower retainer 50 are both rigid materials that must resist significant bending under loading. Common materials for these parts may be glass filled plastics or steel sheet metal. Between upper retainer 48 and top side heat conduction path 24 is upper foam spring 44. Upper foam spring 44 acts as a spring to load top side heat conduction path 24 against integrated circuit 22. Upper foam spring 44 can be made of any foam that does not take a compressive set at elevated temperatures, a suitable material is available under the trade name PORONO®. Often times upper foam spring 44 includes a double stick adhesive mounted to one side (not shown). The adhesive can be mounted on either side but it is commonly attached to the side in contact with upper retainer 48. Similarly, between lower retainer 50 and bottom side heat conduction path 26 is lower foam spring 46. This material is often the same as upper retainer 48 with the optional adhesive preferentially mounted to lower retainer 50. A plurality of retainer screws 52 are used to draw upper retainer 48 and lower retainer 50 together thereby placing upper foam spring 44 and lower foam spring 46 in compression. The subsystem described above is known in the art. The design described above may be a portion of a larger system as described in U.S. Pat. No. 5,673,176-Penniman et al.

Unique to this invention is the presence of an inner thermistor 32 and an outer thermistor 34 and the way in which they are used. Inner thermistor 32 and outer thermistor 34 are mounted to PCB 30. Inner thermistor 32 and outer thermistor 34 sense the temperature of PCB 30 at known distances from integrated circuit 22.

OPERATION OF THE PREFERRED EMBODIMENT

Heat is produced at the die within integrated circuit 22. The power delivered to integrated circuit 22 is easily measured using a shunt resistor and circuitry (not shown). The heat flow is initially conductive through top side heat conduction path 24, bottom side heat conduction path 26 and board level heat conduction path 28. When the surrounding environment is a lower temperature than the conduction paths, heat will convect and radiate from the conduction paths to the environment. At steady state, the heat flux from a conduction path to the environment necessarily determines the amount of heat flowing through that particular conduction path. Consider board level heat conduction path 28. By taking temperature measurements at inner thermistor 32 and outer thermistor 34, the following equation can be produced.

$$P(32:34) = -k(32:34)A(32:34)[T(34)-T(32)]/X(32:34) \quad (1)$$

Where;

$P(32:34)$ is the heat flux between inner thermistor 32 and outer thermistor 34;

$k(32:34)$ is the effective thermal conductivity of PCB 30 between inner thermistor 32 and outer thermistor 34;

$A(32:34)$ is the effective area of the heat path between inner thermistor 32 and outer thermistor 34;

$X(32:34)$ is the distance between inner thermistor 32 and outer thermistor 34;

$T(34)$ is the sensed temperature at outer thermistor 34; and $T(32)$ is the sensed temperature at inner thermistor 32.

The true power dissipated by board level heat conduction path 28 is $P(J:32)$ where J is the junction of integrated circuit 22. The difference between $P(32:34)$ and $P(J:32)$ is the amount of heat that is convected/radiated from PCB 30 between integrated circuit 22 and inner thermistor 32 and between inner thermistor 32 and outer thermistor 34. If inner thermistor 32 is attached close to integrated circuit 22 and outer thermistor 34 is attached close to inner thermistor 32, this amount can often be neglected. If it is not neglected, a small correction factor, C, determined analytically or empirically should be applied to make $P(32:34)$ and $P(J:32)$ equivalent.

$$P(J:32) = P(32:34) + C \quad (2)$$

Another equation similar to EQN. (1) can be produced.

$$P(J:32) = -k(J:32)A(J:32)[T(32)-T_j]/X(J:32) \quad (3)$$

Where;

$P(J:32)$ is the heat flux between the junction of integrated circuit 22 and inner thermistor 32;

$k(J:32)$ is the effective thermal conductivity between the junction of integrated circuit 22 and inner thermistor 32;

$A(J:32)$ is the effective area of the heat path between the junction of integrated circuit 22 and inner thermistor 32;

$X(J:32)$ is the distance between the junction of integrated circuit 22 and inner thermistor 32;

$T_j$ is the temperature at the junction of integrated circuit 22; and $T(32)$ is the sensed temperature at inner thermistor 32.

Combining EQNS. (1) and (3) and solving for $T_j$ yields, $$T_j = T(32) - [X(J:32)/k(J:32)A(J:32)]\{[k(32:34)A(32:34)[T(34)-T(32)]/X(32:34)] - C\} \quad (4)$$

If all of the variables above are known then $T_j$ can be solved directly. The difficult terms in this equation are $k(J:32)$ and $k(32:34)$. These are difficult terms to predict analytically mainly because of the thermal impedances at the interfaces between the different materials. A more reliable method to determine $k(J:32)$ and $k(32:34)$ would be to do so empirically. To do this a special test set-up would need to be employed for each particular implementation.

Figure 3A:
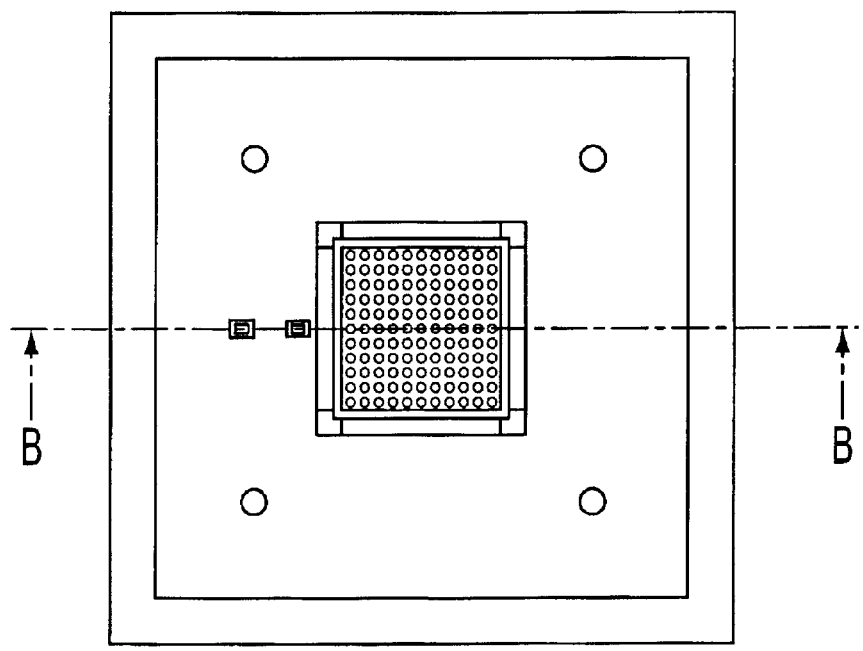
Figure 3B:
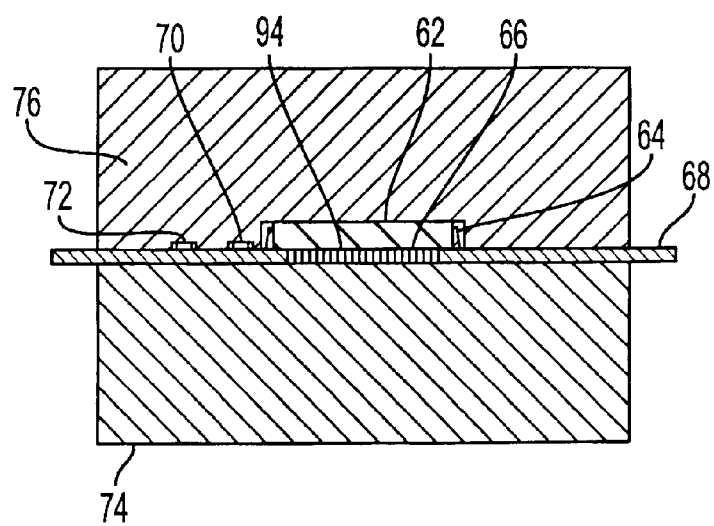
FIG. 3b is a cross section view of the devices shown in FIG. 3a with the section taken along line B—B.

Referring now to FIGS. 3a and 3b, the special test set-up is illustrated. A thermal test chip 62 is used in place of integrated circuit 22. This test component has similar exterior dimensions and similar material properties as integrated circuit 22. In place of the die, thermal test chip 62 has a resistive heater with a temperature sensing means. Thermal test chip 62 is attached to a thermal test PCB 68 via a die/PCB thermal interface material 66 and a plurality of thermal test chip leads 64. Thermal test chip leads 64 are attached to thermal test PCB 68 using the same technique that integrated circuit leads 60 is attached to PCB 30. It is important that as much commonality exists between the special test set-up shown in FIGS. 3a and 3b and the actual implementation such as shown in FIGS. 1a and 1b. This commonality will ensure that a calculation of a thermal conductivity in the test set-up can be related to the thermal conductivity in the actual implementation. Die/PCB thermal interface material 66 should be the same material and applied in the same technique as die attach epoxy 58. Thermal test PCB 68 should have a very similar construction to PCB 30 so that their thermal properties are equivalent. A series of PCB thermal vias 94 extend from one side of thermal test PCB 68 to the other similar in material and construction to PCB thermal vias 56. Similar to inner thermistor 32 and outer thermistor 34, an inner thermistor 70 and an outer thermistor 72 are mounted to thermal test PCB 68. Inner thermistor 70 and outer thermistor 72 sense the temperature of thermal test PCB 68 at known distances from thermal test chip 62. Below and adjacent to thermal test PCB 68 is a lower insulating material 74. Above and adjacent to thermal test PCB 68 is an upper insulating material 76. As the name implies, lower insulating material 74 and upper insulating material 76 can be a variety of materials as long as they act as a thermal insulator directing the heat flux to be primarily within thermal test PCB 68.

Heat is produced at the die within thermal test chip 62. The power delivered to thermal test chip 62 is easily measured using a shunt resistor and circuitry (not shown). The heat flow is conductive through thermal test PCB 68 until it reaches beyond the extent of lower insulating material 74 and upper insulating material 76 at which point it is convected and radiated to the environment. If the test set-up is allowed to reach steady state, the measurements at inner thermistor 70 and outer thermistor 72 can be used to calculate the thermal conductivity between thermal test chip 62 and inner thermistor 70 and between inner thermistor 70 and outer thermistor 72 using EQNS. (5) and (6).

$$P(test) = -k(62{:}70)A(62{:}70)[T(70)-T(testJ)]/X(62{:}70) \quad (5)$$

$$P(test) = -k(70{:}72)A(70{:}72)[T(72)-T(70)]/X(70{:}72) \quad (6)$$

Where;
- k(62:70) is the effective thermal conductivity between thermal test chip 62 and inner thermistor 70;
- k(70:72) is the effective thermal conductivity of thermal test PCB 68 between inner thermistor 70 and outer thermistor 72;
- A(62:70) is the effective area of the heat path between thermal test chip 62 and inner thermistor 70;
- A(70:72) is the effective area of the heat path between inner thermistor 70 and outer thermistor 72;
- X(62:70) is the distance between thermal test chip 62 and inner thermistor 70;
- X(70:72) is the distance between inner thermistor 70 and outer thermistor 72;
- T(70) is the sensed temperature at inner thermistor 70;
- T(72) is the sensed temperature at outer thermistor 72;
- T(testJ) is the sensed temperature at the die of thermal test chip 62.

If the similarities between the test set-up in FIGS. 3a and 3b and the actual implementation in FIGS. 1a and 1b are strong, then k(62:70)=k(J:32) and k(70:72)=k(32:34). With the solving of these thermal conductivities, EQN. (4) can be solved for $T_j$.

Although this is a unique and very achievable method for solving for $T_j$, it will not be adequate in all cases. The test set-up in FIGS. 3a and 3b is done only once or a limited number of times for each particular implementation. It assumes that k(J:32) and k(32:34) are consistent from one assembly to the next and that their values do not change over time. This is sometimes not the case. Many of the materials exhibit lot to lot and piece to piece variations that will effect k(J:32) and k(32:34). In addition, many designs require that top side heat conduction path 24 be removable to replace or upgrade integrated circuit 22. Upon the removal and replacement of top side heat conduction path 24, upper thermally conductive conformal interface material 36 may become damaged or may be replaced by a different material entirely. This will influence the power dissipating capacity of top side heat conduction path 24 and therefore the heat flux distribution between top side heat conduction path 24, bottom side heat conduction path 26, and board level heat conduction path 28 will be altered. Furthermore, die attach epoxy 58 can become damaged by flexing PCB 30. This damage will represent itself as increased thermal impedance. k(J:32) and the heat flux distribution between top side heat conduction path 24, bottom side heat conduction path 26 and board level heat conduction path 28 will be altered.

Figure 4:
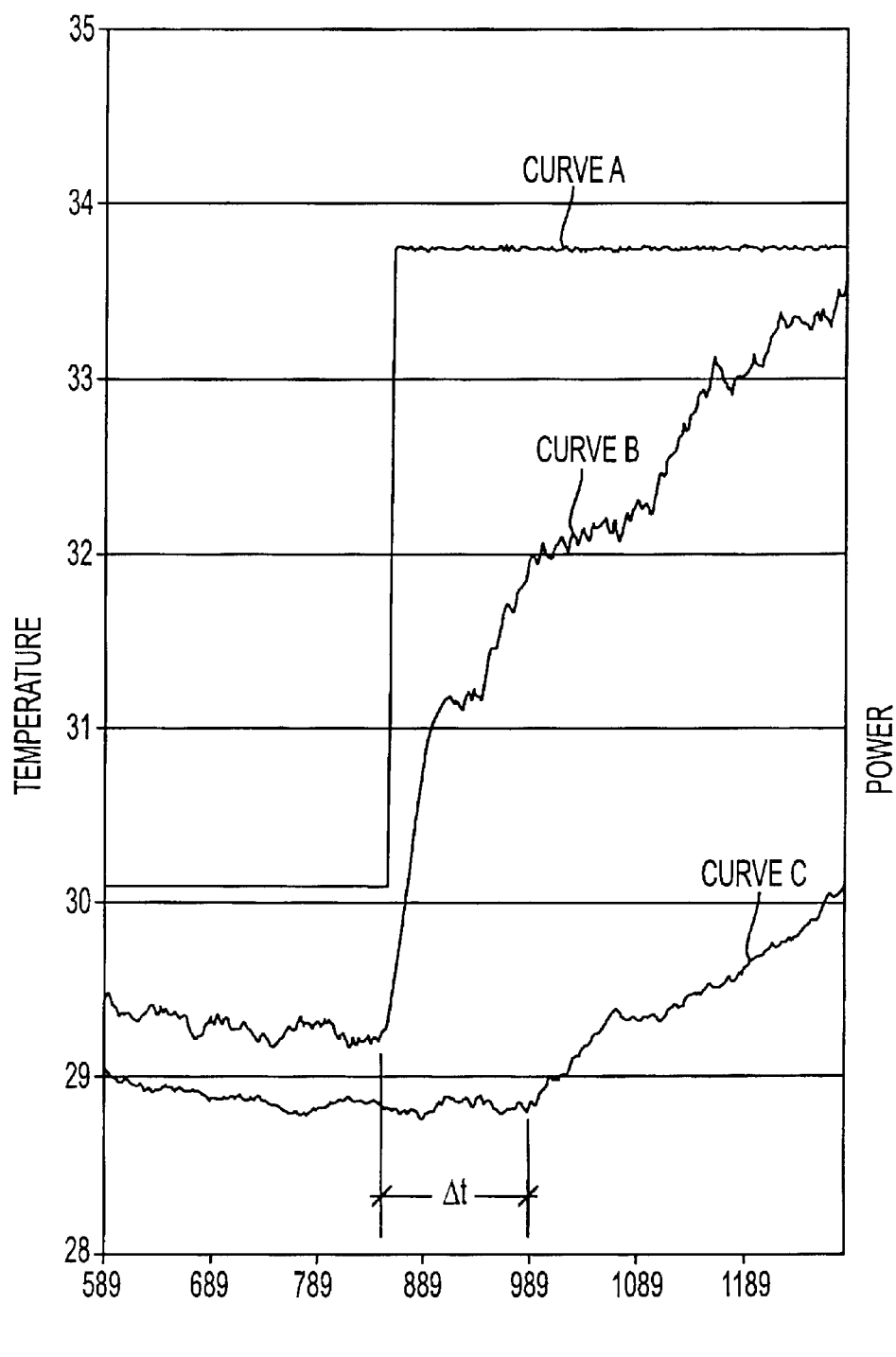
FIG. 4 is a graph demonstrating how power of the semiconductor device relates to temperature at the device and elsewhere in the system as a function of time.

Referring to FIG. 4, this difficulty can be overcome by observing the effects of power transients. As more power is delivered to integrated circuit 22 (curve A), the temperature at the junction (curve B) increases almost immediately. It takes some time though for the temperature to increase at a position remote from the junction. For example, Curve C in FIG. 4 may represent the temperature at inner thermistor 32 at a remote location from integrated circuit 22. The time rate of change of the temperature at any point in the medium may be determined from the EQN. (7).

$$\delta T/\delta t = \alpha(\delta^2 T/\delta x^2) + (\delta q/\delta t)\rho c_p$$

Where;
- T is temperature;
- t is time;
- $\alpha = k/\rho c_p$;
- k is the thermal conductivity of the medium;
- $\rho$ is the density of the medium;
- $c_p$ is the heat capacity of the medium;
- x is the distance from the heat source;
- q is the heat flux from the heat source.

$\alpha$ is referred to as thermal dissusivity. It measures the ability of a material to conduct thermal energy relative to its ability to store it. The larger $\alpha$ is, the faster the material will respond to changes in temperature. The larger $\alpha$ is, the smaller $\Delta t$ will be in FIG. 4. $\rho$ and $c_p$ are material properties that are not influenced by changes in the thermal interfaces between the materials. Thus, the thermal conductivity k(32:34) and k(J:32) can be determined by observing the temperature response following power transients. This type of problem is commonly referred to as an Inverse Heat Conduction Problem (IHCP). There are many ways of solving this problem discussed in the literature. Some of the more relevant methods are referenced in the Publications section above.

The embodiment described above works very well for thermal solutions where the heat flux is radially symmetric about the source. The measurements can be described at a point that is representative of all measurements with radial equivalence. Likewise, the above embodiment is valid for measured thermal solutions that are effectively one dimensional. An example of this is a heat pipe. Inner thermistor 32 and outer thermistor 34 can be located at known distances from the source along the heat pipe. A point measurement on the heat pipe is valid for the entire heat pipe at that distance from the source. There are cases though when measuring a distinct pair of points is not adequate for determining the junction temperature. Multiple pairs of thermal sensors located around the source can provide a more accurate representation of the heat flux in a particular thermal path. Other techniques to overcome this problem are described below as alternate embodiments.

DESCRIPTION OF AN ALTERNATE EMBODIMENT

Figure 5A:
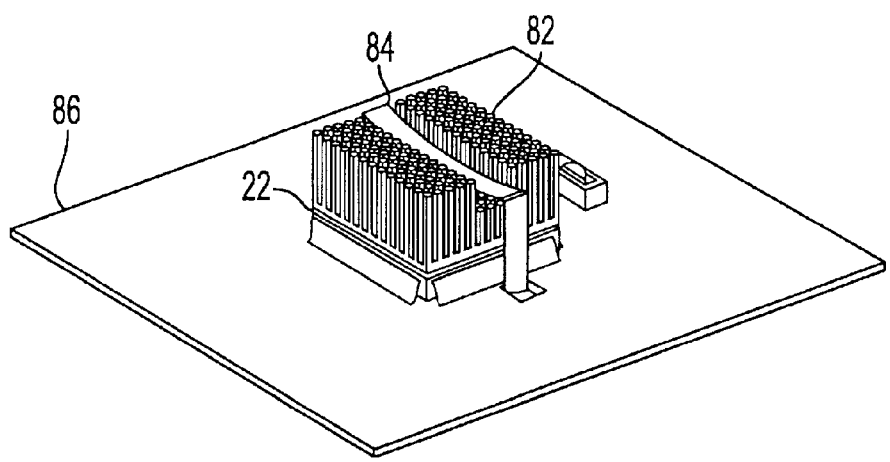
FIG. 5a is an isometric view of a portion of an alternate assembly that contains a semiconductor device, its accompanying thermal solution, and an alternate embodiment of the present invention's junction temperature monitoring means incorporated therein.
Figure 5B:
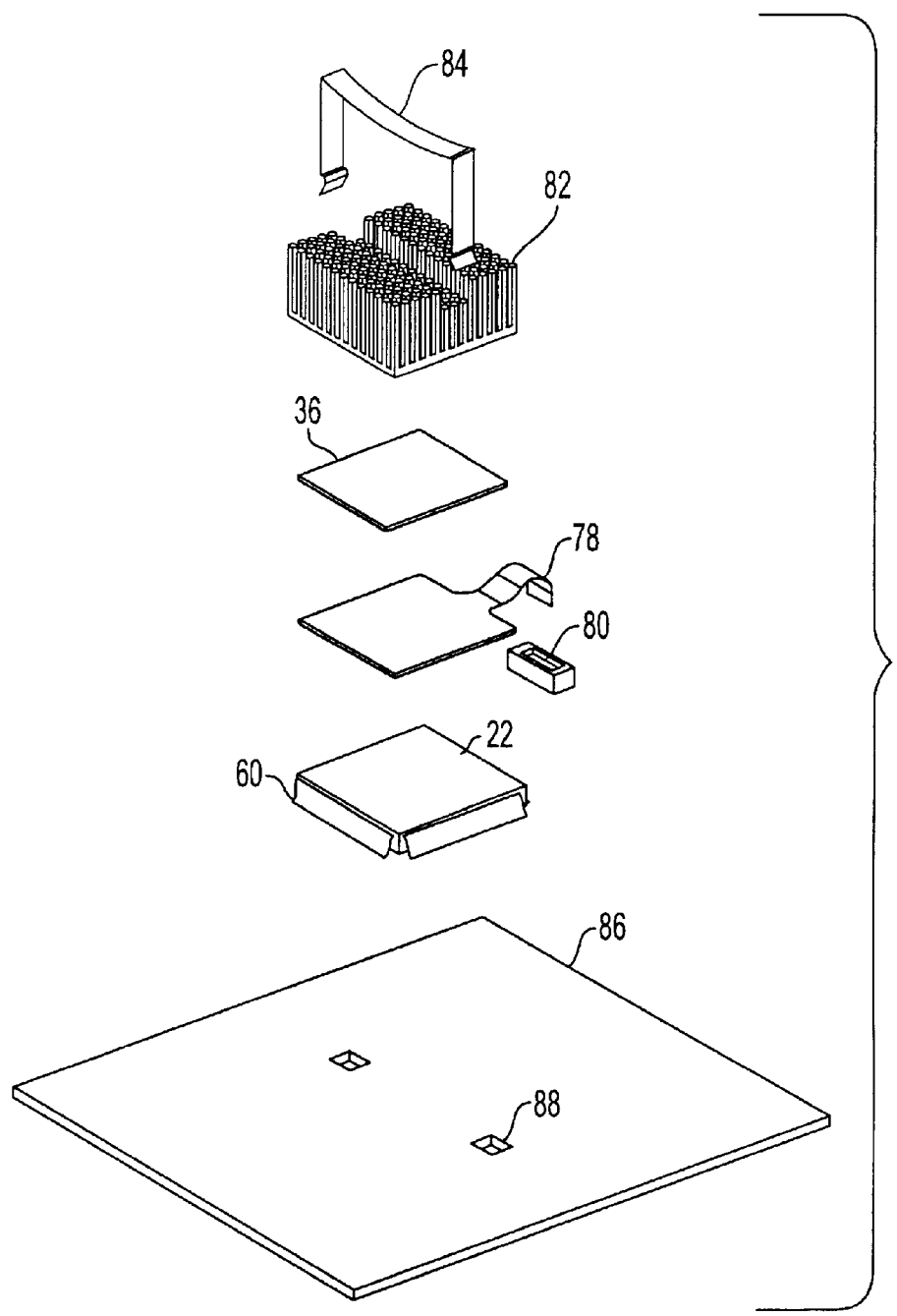

Referring now to FIGS. 5a and 5b, an alternate embodiment of the above described invention is shown. This particular combination of elements shows only two conductive thermal paths as opposed to three described above. As above, each of these thermal paths transfers heat away from the heat source, regulating its temperature. An integrated circuit 22 is the source of the heat. Integrated circuit 22 is attached to an alternate PCB 86 via a plurality of integrated circuit leads 60 by, for example, solder reflow techniques. Integrated circuit 22 also makes incidental contact with alternate PCB 86 via its base. Both of these connections, in parallel, combine to define the thermal impedance of the PCB thermal path. The other thermal path takes heat out the top of integrated circuit 22. This thermal path is comprised of a heat flow sensor 78, an upper thermally conductive conformal interface material 36, and a heat sink 82. From heat sink 82, the heat is connectively transferred to the surrounding environment. Heat flow sensor 78 is commonly referred to as a "thick film sensor". The sensor detects heat flux with a differential thermopile. As the heat flows through the sensor, a small temperature difference develops across the thermal resistance elements of the thermopile. This sensor and sensors similar to it are presently available. One particular example is Episensor, available from Vatell Corporation, Blacksburg, Va. This particular heat flow sensor can be constructed with an additional foil thermocouple for simultaneous temperature and heat flux measurement. The voltage signals for heat flow and temperature are brought external to the sensor via a flex circuit or individual leads to a heat flow sensor connector 80. Heat flow sensor connector 80 is electrically mounted to alternate PCB 86. This particular sensor is optionally available with pressure sensitive adhesive mounted to one side (not shown). This adhesive, if used, should be mounted toward integrated circuit 22 so that it remains well connected to the top surface of integrated circuit 22 throughout its life. Immediately adjacent to heat flow sensor 78 is upper thermally conductive conformal interface material 36. Upper thermally conductive conformal interface material 36 can be made of any thermally conductive conformal material, a suitable material being Parker Chomerics A274. Upper thermally conductive conformal interface material 36 is commonly available with pressure sensitive adhesive premounted on one side. In this implementation, it is preferable to mount the adhesive on the heat sink 82 side of upper thermally conductive conformal interface material 36 rather than the heat flow sensor 78 side. In this way, heat sink 82 may be removed to inspect the condition of heat flow sensor 78. Another option would be to have the adhesive on heat flow sensor 78 contact upper thermally conductive conformal interface material 36. In this way the entire upper thermal solution may be removed, integrated circuit 22 replaced, and the heat solution could be reattached without potential loss of parts. Adjacent to upper thermally conductive conformal interface material 36 is heat sink 82. Heat sink 82 is commonly an aluminum extrusion with post-machining operations. This part is either custom made for each particular implementation or is ordered as an off-the-shelf from a heat sink vendor such as Avid. Loading this upper thermal path and ensuring good contact, is a heat sink clip 84. Heat sink clip 84 is a spring steel part which clips onto alternate PCB 86 via multiple clip retention holes 88.

OPERATION OF AN ALTERNATE EMBODIMENT

Heat is produced at the die within integrated circuit 22. Heat is conducted through the upper thermal path and through the PCB thermal path. As described, the upper thermal path has lower thermal impedance than the PCB thermal path. Thus, a majority of the heat will travel through the upper thermal path. Although it would be possible to measure $T_j$ utilizing the method described in the preferred embodiment, the calculation would be more prone to errors in a situation such as this where the majority of the heat flows through a different thermal path. Therefore, an integral heat flow sensor is utilized where the heat flows through its thickness. The temperature measured at heat flow sensor 78 is equivalent to the case temperature of integrated circuit 22. By also measuring the heat flow through heat flow sensor 78, $\theta_{JX}$ (described previously in description of related art) can be used to directly determine $T_j$. In contrast, traditionally the case temperature of integrated circuit 22 is measured. Circuitry on alternate PCB 86 determines the power delivered to integrated circuit 22. This power number and $\theta_{JX}$ are used to calculate $T_j$. This tends to overestimate the junction temperature as it neglects the power that leaves via the PCB thermal path.

DESCRIPTION OF AN ALTERNATE EMBODIMENT

Figure 6:
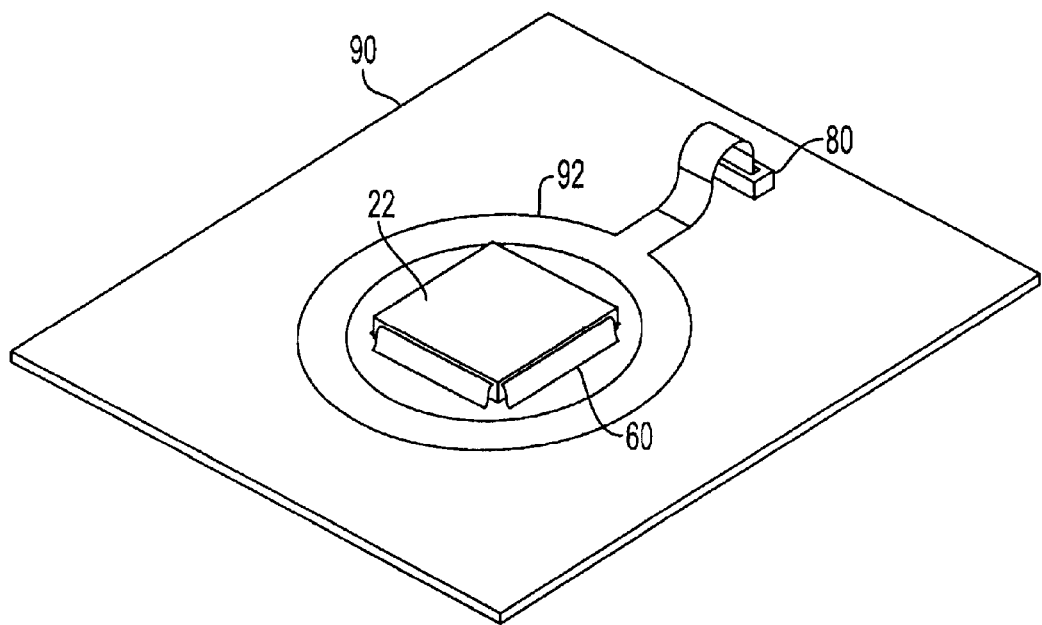
FIG. 6 is an isometric view of a portion of an alternate assembly that contains a semiconductor device and an alternate embodiment of the present invention's junction temperature monitoring means incorporated therein.

Referring now to FIG. 6, an alternate embodiment of the above described invention is shown. This particular combination of elements shows only one conductive thermal path as opposed to three described in the preferred embodiment. Similar to the other embodiments, an integrated circuit 22 is the source of the heat. Integrated circuit 22 is attached to an alternate PCB 90 via a plurality of integrated circuit leads 60 by, for example, solder reflow techniques. Integrated circuit 22 also makes incidental contact with alternate PCB 90 via its base. Both of these connections, in parallel, combine to define the thermal impedance of the alternate PCB 86 thermal path. Attached to alternate PCB 90 is a radial heat flow sensor 92 via pressure sensitive adhesive (not shown). Radial heat flow sensor 92 is a sensor where the heat flux that is measured, takes place radially (as opposed to through its thickness as in the previous alternate embodiment). Radial heat flow sensor 92 can be constructed as a pair of concentric resistive temperature devices (RTD). Each RTD is a known length of platinum wire embedded into a flex circuit. As the temperature of this wire changes, its resistance changes by a predictable amount. These resistive signals are taken off the sensor via a tail to the flex that plugs into a heat flow sensor connector 80.

OPERATION OF AN ALTERNATE EMBODIMENT

Heat is produced at the die within integrated circuit 22. A portion of the heat is convected and radiated directly to the environment off the top surface of integrated circuit 22. Other heat is conducted into alternate PCB 90 where it conducts from the source and is eventually convected and radiated to the environment. Because of the previously mentioned difficulty in measuring the ambient temperature reliably, the conductive path is sensorized. All the same equations from the preferred embodiment can be employed with the following assumptions. Inner thermistor 32 in the preferred embodiment is replaced by the inner concentric RTD in radial heat flow sensor 92. Outer thermistor 34 in the preferred embodiment is replaced by the outer concentric RTD in radial heat flow sensor 92. Using the techniques described above, $T_j$ can be determined. The individual sensors described in the preferred embodiment have many advantages including cost and space. They do, however, have limitations when the heat flux from the source is not radially symmetric. This may occur, for example, when integrated circuit 22 is mounted close to one particular edge of its thermal path. Then, edge effects determine that a different amount of heat flows toward the edge compared to away from it. One way to overcome this problem is the use of radial heat flow sensor 92. This radially integrates the heat flow so that symmetry is not important.

DESCRIPTION OF AN ALTERNATE EMBODIMENT

Figure 7:
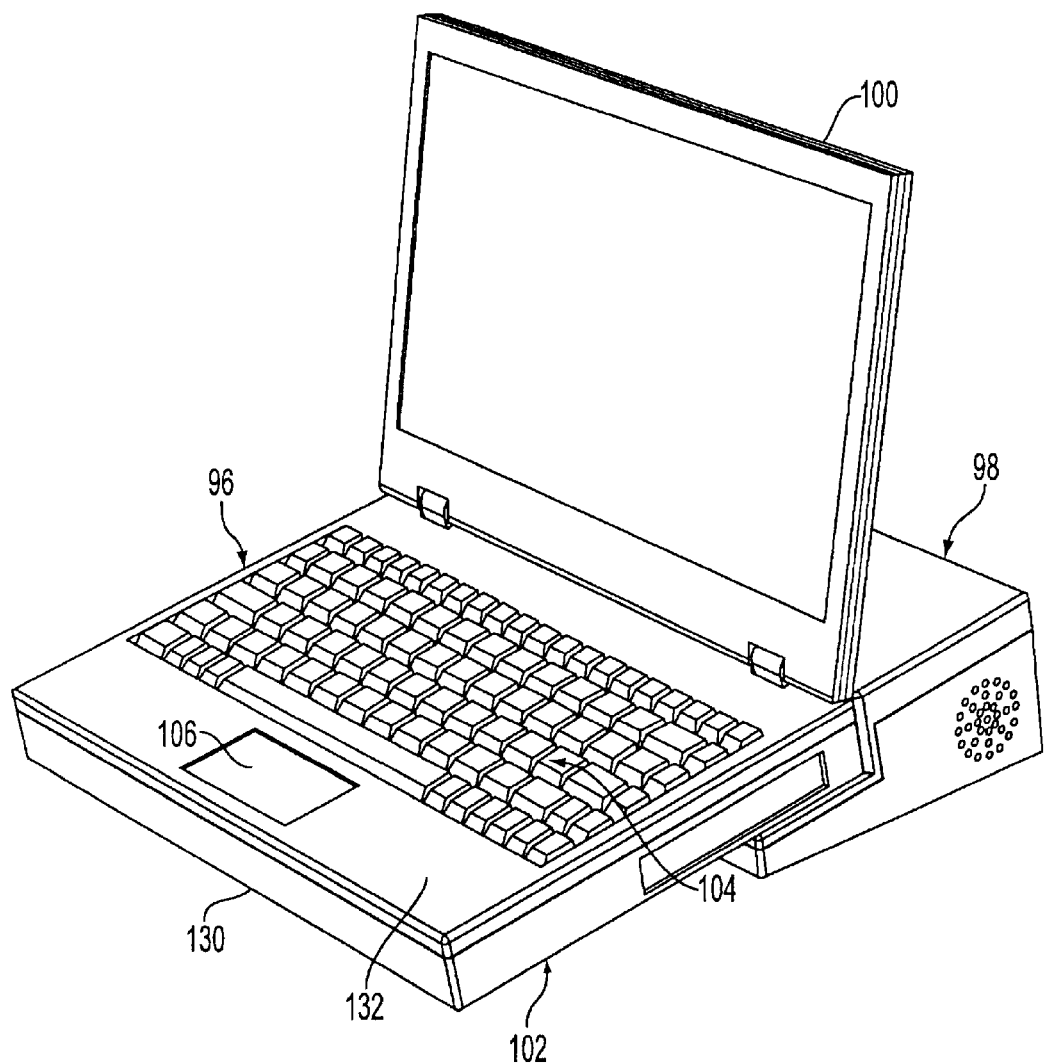
FIG. 7 is a front perspective view of a portable computer that contains a thermal dissipation monitoring means connected to a portable computer dock.

Referring to FIG. 7, a portable computer 96 connected to a portable computer dock 98 is illustrated. Portable computer 96 is seen to generally include a display module 100 pivotally mounted to a base assembly 102, a keyboard subassembly 104, and a touch sensitive pointing device 106, used to control the on-screen cursor.

Figure 8:
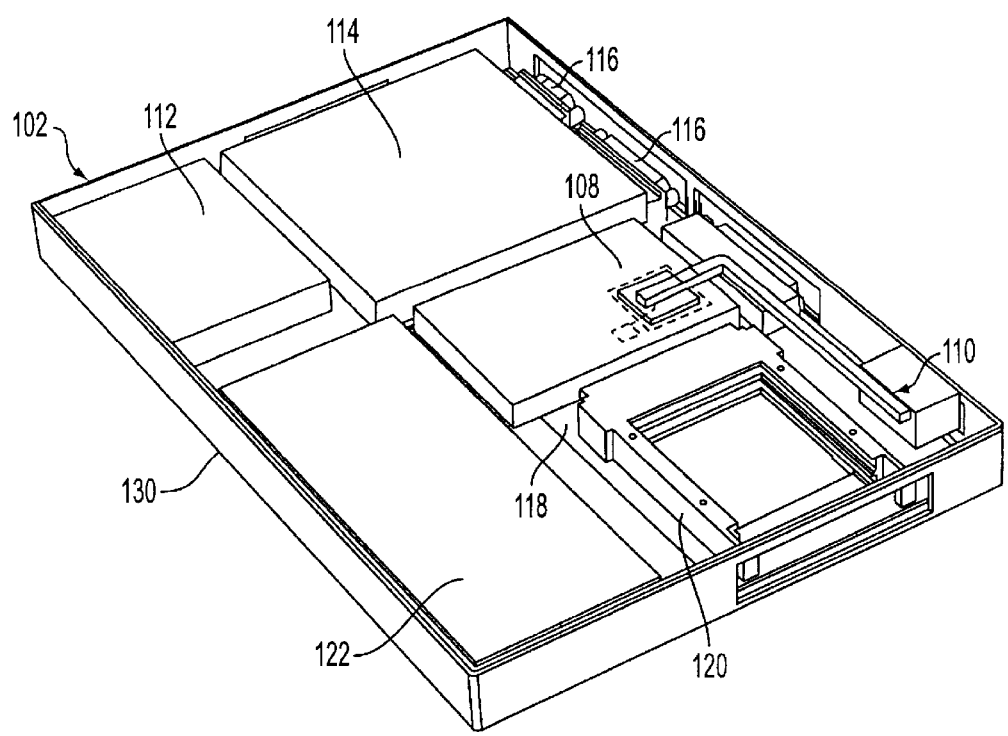
FIG. 8 is a front perspective view of a portable computer in FIG. 7 with the base top housing removed.

As seen in FIG. 8, base assembly 102 comprises a microprocessor module 108, a heat-moving subassembly 110, a hard disk drive 112, a media drive 114, a plurality of input/output connectors 116, a printed circuit board 118, a PC Card connector 120, and a battery pack 122.

Figure 9:
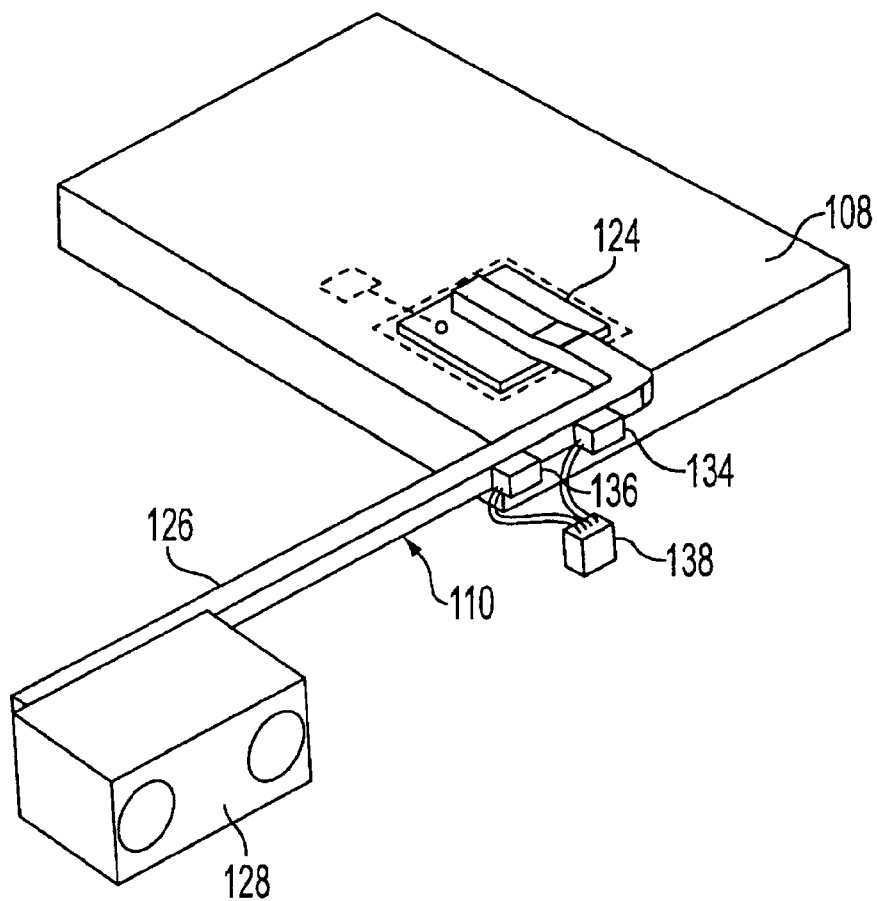
FIG. 9 is a rear perspective view of a heat-moving sub-assembly that is contained in the portable computer shown in FIG. 7.

Referring now to FIG. 9, heat-moving subassembly 110 is comprised partially of a thermal attachment plate 124, a heat pipe 126, and a portable side thermal connector 128. Heat pipes move heat because of a phase change of a liquid contained in them and are well known in the art of portable computer design. Thermal attachment plate 124 is thermally and mechanically attached to microprocessor module 108 and heat pipe 126. The other end of heat pipe 126 is thermally and mechanically attached to portable-side thermal connector 128.

As shown in FIGS. 7 and 8, all of these components are contained by a base bottom housing 130 and a base top housing 132. Base bottom housing 130 and base top housing 132 are arranged in a clam shell configuration. It should be understood that microprocessor module 108, printed circuit board 118, and input/output connectors 116 are well known in the art and are shown schematically so that the detail does not obscure the present invention.

Relating to the present invention, heat-moving sub assembly 110 also contains an inner thermistor 134 and an outer thermistor 136. Both inner thermistor 134 and outer thermistor 136 are electrically connected to a thermistor electrical connector 138, which in turn is electrically connected to printed circuit board 118.

OPERATION OF AN ALTERNATE EMBODIMENT

When portable computer 96 is used in a docked configuration, it is mechanically, electrically and thermally connected to portable computer dock 98. Portable computer dock 98 can contain a heat sink, a fan, a thermoelectric unit or a variety of other thermal dissipation devices. The thermal connection between portable computer 96 and portable computer dock 98 allows portable computer 96 to move a portion of its heat load to portable computer dock 98 where it in turn is moved to the environment. Portable computer dock 98, in addition to portable computer 96, is able to dissipate more heat than portable computer 96 alone. Assume that the computer and the dock are separated. When the computer is turned on, various components and subsystems inside portable computer 96 begin to produce heat due to the electrical impedance of their circuitry. Microprocessor module 108 especially produces a large amount of heat. Because portable computer 96 is not connected to portable computer dock 98, there is not a large heat flux through heat pipe 126. Inner thermistor 134 and outer thermistor 136 acting together as a heat flow sensor can determine this as their temperatures, even though they are separated by a distance along heat pipe 126, is similar. When this same system is connected to portable computer dock 98, heat can flow from microprocessor module 108 to portable computer dock 98 via heat-moving sub-assembly 110. This heat flux is evidenced by a temperature differential between inner thermistor 134 and outer thermistor 136. Thus, portable computer 96 can determine if it is connected to portable computer dock 98 and what quality of an attachment exists based upon the measured heat flux in heat pipe 126. Portable computer 96, when not connected to portable computer dock 98, may regulate the clock speed of microprocessor module 108 in order to prevent overheating. When connected, because of the extra cooling capacity, the clock speed of microprocessor module 108 may be increased. An advantage that this technique has over an electrical or mechanical state sensor determining the dock state is that the heat flux measurement is analog. If the thermal connection between portable computer 96 and portable computer dock 98 is sub-optimal because of contaminants or other like matter, the clock speed of microprocessor module 108 can be adjusted so that it is running at the limit of performance while keeping temperatures below critical limits. A digital state electrical or mechanical sensor has no such control.

As mentioned, the dock could contain active or powered thermal regulating devices. When portable computer 96 is not connected to portable computer dock 98, there is no reason for these devices to be active. The heat flux sensor in portable computer 96 can feed the heat flux information to portable computer dock 98 via one of the input/output connectors. Portable computer dock 98 can use this information to activate its internal active devices appropriately.

DESCRIPTION OF AN ALTERNATE EMBODIMENT

Figure 10A:
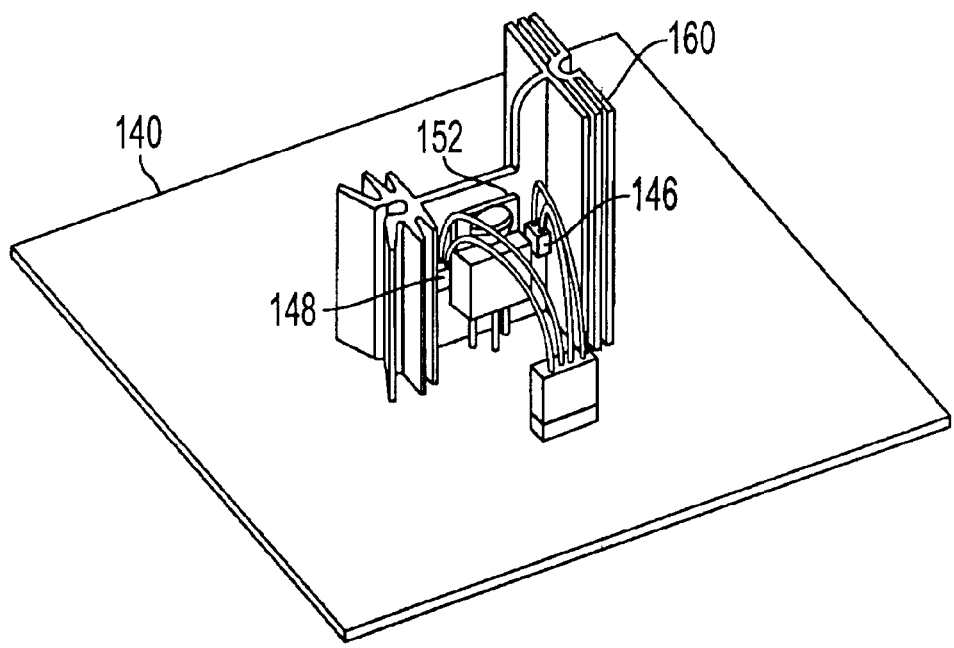
FIG. 10a is an isometric view of a portion of an alternate assembly that contains a semiconductor device, its accompanying thermal solution, and an alternate embodiment of the present invention's junction temperature monitoring means incorporated therein.
Figure 10B:
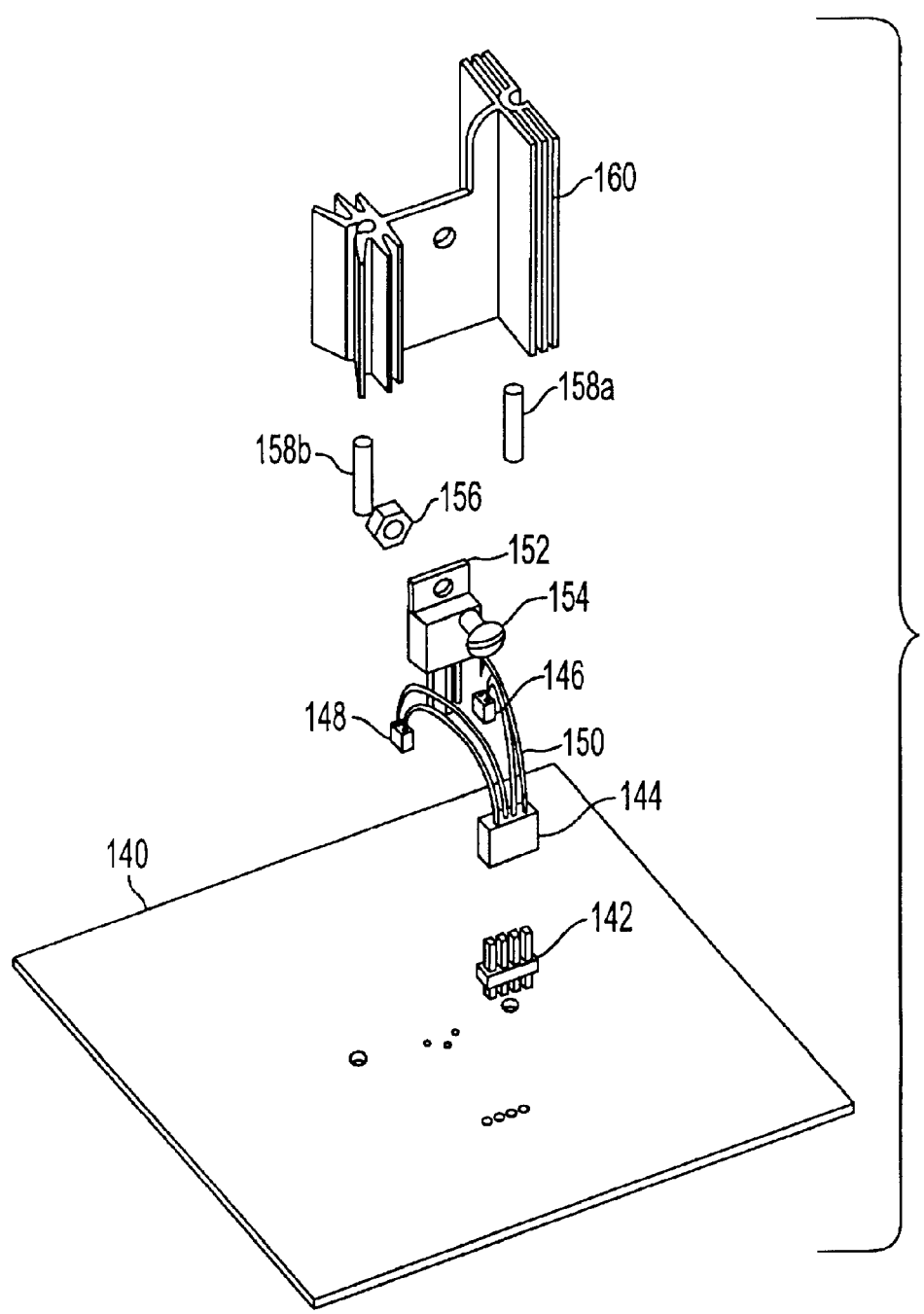

Referring now to FIGS. 10a and 10b, an alternate embodiment of the above described invention is shown. In this particular embodiment a transistor 152 is shown as the heat source. This package is commonly referred to as a TO-220O. Transistor 152 is attached to a heat sink 160 using a bolt 154 and a nut 156. It is common to apply a thermal transfer medium such as thermal grease (not shown) between transistor 152 and heat sink 160 prior to assembly. Heat sink 160 is shown as an aluminum extrusion with some post machining operations. The shape of heat sink 160 is often unique for each particular application. A nonsymetric shape is shown which might be the case in a space constrained application. Transistor 152 is also attached to an alternate PCB 140 via its leads using a technique such as wave soldering. Also attached to alternate PCB 140 is a PCB connector 142 and a pair of heat sink posts 158$a,b$ using a technique such as wave soldering. Heat sink 160 is mechanically secured to the assembly by slipping the extrusion over heat sink posts 158$a,b$. Transistor 152 is flanked on either side by a thermistor 146 and a thermistor 148.

Thermistor 146 and thermistor 148 can be attached to heat sink 160 via thermally conductive epoxy (not shown). Electrically connecting thermistor 146 and thermistor 148 to the assembly are a plurality of thermistor leads 150. Thermistor leads 150 terminate in a thermistor connector 144 which in turn plugs into PCB connector 142.

OPERATION OF AN ALTERNATE EMBODIMENT

When power is applied to transistor 152, the die of transistor 152 begins to generate heat. This heat is conducted to the case of the device, through the thermal interface material (not shown), and into heat sink 160. Because of the irregular shape of heat sink 160, the distribution of the heat into the heat sink is nonuniform. An analysis of the heat distribution could be made using numerical techniques such as finite element or finite difference. These techniques rely on assumptions about the condition and quality of the thermal interface and the air currents around heat sink 160. Quite often in applications the air currents around heat sinks are a very complex function of position and can also vary over the life of the application. Even if heat sink 160 was symmetrical about transistor 152, the temperature distribution might not be even because of air currents. Thus, a real-time empirical method is necessary to accurately predict the temperature of transistor 152. On either side of transistor 152, thermally attached to heat sink 160 is thermistor 146 and thermistor 148. These monitor the temperature on either side of transistor 152. If the assumption can be made that the thermal convection and radiation directly off the case of transistor 152 can be ignored compared to the total power being dissipated by the device, then the following equations can be used to predict its junction temperature.

$$P(146)=-k(152{:}146)A(152{:}146)[T_j-T(146)]/X(152{:}146) \quad (8)$$

$$P(tot)-P(146)=-k(152{:}148)A(152{:}148)[T_j-T(148)]/X(152{:}148) \quad (9)$$

Where;

P(146) is the power delivered to the heat sink in the direction of thermistor 146;

P(tot) is the total power delivered to the device;

k(152:146) is the effective thermal conductivity between transistor 152 and thermistor 146;

k(152:148) is the effective thermal conductivity between transistor 152 and thermistor 148;

A(152:146) is the effective area of the heat path between transistor 152 and thermistor 146;

A(152:148) is the effective area of the heat path between transistor 152 and thermistor 148;

X(152:146) is the distance between transistor 152 and thermistor 146;

X(152:148) is the distance between transistor 152 and thermistor 148;

T(146) is the sensed temperature at thermistor 146; and

T(148) is the sensed temperature at thermistor 148.

The unknowns in EQNS. (8) and (9) are P(146) and $T_j$. Besides these terms, the others that often prove difficult to determine are k(152:146) and k(152:148). These thermal conductivity terms can be determined analytically by a working knowledge of the materials involved or they can be determined empirically. If it is desired to determine these values empirically, an insulated thermal test set-up similar to the one described in detail in the OPERATION OF THE PREFERRED EMBODIMENT can be created to perform such measurements. Because there are two equations and only two unknowns, the above equations can be solved for $T_j$.

It was stated that there was an initial assumption that the combined thermal losses of convection and radiation directly off the case of transistor 152 could be neglected. This is sometimes not the case. In those cases where such losses may be significant, a power correction factor, C, can be added to EQN. (9) resulting in, $$P(tot)-P(146)-C=-k(152{:}148)A(152{:}148)[T_j-T(148)]/X(152{:}148) \quad (10)$$

The value for C can be determined analytically by a working knowledge of the materials and ambient environment, or it can be determined empirically. To determine the value of C empirically, an initial test set-up must be created where the case of transistor 152 is insulated to prevent significant losses due to convection and radiation. EQN. (8) can be rewritten as EQN. (11) and can be solved using the measurements of this test set-up.

$$P(test146)=-k(152{:}146)A(152{:}146)[T_j-T(test146)]/X(152{:}146) \quad (11)$$

Where;

P(test146) is the power delivered to the heat sink in the direction of thermistor 146 in the test set-up only;

T(test146) is the temperature measured at thermistor 146 in the test set-up only.

P(test146) compared to P(146) gives an indication of the amount of power lost to the environment directly off the case of transistor 152. EQN. (12) can then be written to describe the correction term C.

$$C=\{[P(test146)-P(146)]/P(146)\}*P(tot) \quad (12)$$

SUMMARY, RAMIFICATIONS AND SCOPE

As described on the basis of the preferred embodiment, and, in comparison with the conventional art, the junction temperature monitoring technique of the present invention achieves dramatic improvements in performance, reliability, and device safety as follows:

(1) The junction temperature of electronic devices can be accurately determined from remote measurements.

(2) The junction temperature of electronic devices can be accurately determined in a cost effective manner.

(3) The junction temperature of electronic devices can be accurately determined regardless of the number or type of thermal solutions employed.

(4) The junction temperature of electronic devices can be accurately determined regardless of the lot to lot or piece to piece variability of thermal dissipation means.

(5) The junction temperature of electronic devices can be accurately determined for devices that are already existing. In other words, the devices themselves do not need to be redesigned to accommodate the present invention.

(6) The junction temperature of electronic devices can be accurately determined only for devices and/or environments where such information has value.

(7) The junction temperature of electronic devices can be accurately determined regardless of environmental fluctuations.

(8) The junction temperature of electronic devices can be accurately determined regardless of changes to the state of the thermal solution of the device.

(9) The thermal dissipation state of an electronic system can be determined. This information can be used to regulate the device or associated device~

Although the description above contains many specificities, these should not be construed as limiting the scope of the invention, but merely providing illustration of some of the presently preferred embodiments of this invention. Many other variations are possible. For example, in each of the embodiments a different number of thermal paths were shown. This was intended to demonstrate the variety of thermal dissipation techniques. Each of the embodiments described above are valid for an application of any number and type of thermal solutions. The type of sensors shown was also mentioned to demonstrate variety. There are many other types of temperature and heat flow sensors available that are not mentioned here. In practice, thermal interface materials and techniques range from none at all to very elaborate solutions with exotic materials. Those mentioned above by no means account for all techniques. In the embodiments described above, the heat flux along a particular thermal dissipation path was determined by measuring the path itself In some cases it may be easier to measure the combined heat flux in the other paths and calculate the remaining heat flux in the path of interest by knowing the total heat dissipated. In all the descriptions above, the thermal paths were described as conductive and uninterrupted between the sensors and the source. This does not have to be the case. As well as changing materials between the source and the sensors, the heat transfer can travel through different types before the sensors (e.g., radiative and convective). One example of this is the use of a heat exchanger. Heat is convected to a fluid. This fluid then transfers its heat to another conductive source. The measurement means can be on this second convective source downstream of the convection portion. Although only a limited number of heat dissipating devices were described above, many others are used commonly. Included in these are heat pipes, heat plates, heat sinks, heat spreaders, black body radiators, heat exchangers, thermoelectric units, and air movers among others. The invention described above is valid for use with any type of heat dissipating device. It is also useful to monitor second and third order effects to more closely determine the source junction temperature. For example, by observing the derivative and second derivative of temperature or heat flow with respect to time, predictions can be made about what the junction temperature is going to be in the future rather than where it is currently. This can be somewhat misleading since there is a thermal time constant between the source and measurement point. Sometimes this time constant can be quite small. In those cases where it is significant, looking at changes in temperature and heat flow may actually help to determine what the junction temperature is when the measurements are taken. Accordingly, the scope of the invention should be determined not by the embodiments described previously, but by the claims following and their legal equivalents.

The main advantage of the design shown herein is that it allows the junction temperature of electronic devices to be accurately determined from remote measurements. Prior art that teaches techniques in this remote sensing field invariably result in inaccuracies because of incorrect assumptions. These assumptions include but are not limited to: the amount of heat flux that is being dissipated along a particular thermal dissipation path, the thermal conductivity between the heat source and the temperature measurement point, the presence of uniformity of temperature in the surrounding environment, stability of the thermal impedance of the thermal dissipation path over time, and stability of the thermal time constant of the thermal dissipation path over time. When these inaccuracies are overestimations, the device may be run slower or shut down earlier than need be. When these inaccuracies are underestimations, the device may not accurately perform its prescribed circuit fiction or runs the risk of permanent damage as the result of overtemperature. Thus, the present invention provides a monitoring and control technique that allows devices to run at their performance limit while keeping their internal temperatures below critical levels.

Another advantage of this invention is that the junction temperature measurement is done in a cost effective manner. In its simplest form, all that is needed is two independent temperature sensors. Some of the other prior art disclosures included a recreation of the device and the thermal solution into a more easily measurable form. This not only adds complexity but it adds significant cost to the overall system.

Another advantage of this solution is that it is independent of the number and type of thermal solutions employed. Many components have multiple thermal dissipation paths associated with them. For example, many high powered components conduct heat from the topside as well as the bottom side of the component. A simple, one point temperature measurement will not suffice in this case because the amount of power delivered to each path is not known. By measuring the heat flux in a particular path as well as the temperature at a point in that path, the junction temperature can be accurately determined. Even for devices that have only one primary thermal dissipation path, there may be other unintentional paths. For example, a component may have a heat sink mounted directly to its case. However, that component may also be mounted to a printed circuit board. This board level thermal path will conduct some of the heat away from the component. Thus, the heat conducted into the heat sink is less that the total power delivered to the component. If this board level thermal path is neglected, the power delivered to the heat sink and the resulting junction temperature will be overestimated.

Another advantage of this process is that the junction temperature for every component can be accurately determined regardless of lot to lot or piece to piece variability. For example, the quality of the thermal interface between a component and a heat sink is highly dependent on manufacturing technique and materials. To be conservative and avoid potential damage to the component due to overheating, a traditional design would have to assume that the interface is less than ideal. This necessarily implies that some components will need to be run at sub-optimal performance levels. By observing the heat flux in the thermal dissipation path of interest, the present invention can respond to these piece to piece variations. Each device can be run at its optimal performance state while keeping its temperature below a critical level.

Another advantage of this invention is the junction temperature of electronic devices can be accurately determined for devices that are already existing. Because the solution is completely independent of the device, the devices do not need to be redesigned to accommodate junction temperature measurement.

Another advantage of this solution is the junction temperature of electronic devices can be accurately determined only where there is a need for such information. Some devices are not particularly susceptible to heat. However, the surrounding environment is sometime severe so that junction temperature measurement is a necessity. The present invention does not penalize the non-extreme users of the device as it would only be used in the severe cases. Conversely, some heat sensitive or large power density components are used in applications that are not challenging from a thermal standpoint. If temperature monitoring is not needed, it doesn't have to be employed. Lastly, some applications need components to be kept thermally stable. The same component in a different application may not have this requirement. Again, the present invention can be selectively applied to meet the particular needs of the application. This is contrasted with some of the prior art that necessitated burdening the die of the device with an on-board temperature sensor.

Another advantage of this process is the junction temperature of electronic devices can be accurately determined regardless of environmental fluctuations. Several disclosures in the prior art use ambient temperature measurement as a method to determine the temperature at the junction. In many cases, the environment to which the device is conveying heat is not at one uniform, definable temperature. Eddy currents, neighboring heat producing devices, changes to ambient radiation, and orientation of the device among others all conspire to make the ambient conditions a very complex function that is not definable by a single point temperature measurement.

Another advantage of this invention is the junction temperature of electronic devices can be accurately determined regardless of changes to the state of the thermal solution of the device. Even if some of the prior air disclosures were able to accurately determine the junction temperature at one point in time, they would have difficulty in determining the temperature throughout the lifetime of the product. Handling can compromise certain thermal interfaces. Other interfaces such as thermal greases improve their properties over time as they flow into the micropores on the surfaces of the contacting materials. Dust can accumulate on heat sinks rendering them less efficient. Users may lower the efficiency of heat transfer to the environment by inadvertently blocking air vents or changing the orientation of the unit to a non-optimal configuration. Because the present invention monitors the temperature and the heat flux in real time, situations such as those mentioned above among other can be accommodated while maintaining optimal device performance.

Another advantage of this process is that the thermal dissipation state of an electronic system can be determined. Since the present invention monitors the heat flux through a particular thermal solution, changes to the efficiency of that thermal path or others can be identified. For example, consider a device where a thermal solution is removable, possibly for portability. When this thermal path, which may be a member of a plurality of thermal paths, is detached, the change in heat flux will be identified. The system may throttle back the power delivered to the device in order to maintain thermal regulation. When the solution is reattached and the monitored heat flux changes, the system can increase the power to the component again to maintain thermal regulation. Additionally, when the thermal solution changes states, this signal can be used to activate or deactivate associated circuitry. For example, assume that it is important to maintain the same performance level to a particular device. When a thermal path is detached, a supplemental thermal regulation device, e.g. an air mover, may be activated.

The present invention is unique and nonobvious in that it includes a thermal sensing and control means that is used in conjunction with a heat flux sensing means, the combination of which allows for an increase in system performance, and an improvement in the reliability of the device being monitored.

It is to be understood that the present invention is not limited to the sole embodiment described above and illustrated herein, but encompasses any and all variations falling within the scope of the appended claims.

What is claimed is:

1. A method for monitoring the temperature of the heat producing portion of an electrical current carrying device comprising the steps, producing a first signal relating to the temperature at one point along a thermal dissipation path associated with said electrical current carrying device, producing a second signal relating to the heat flux between the heat producing portion of said electrical current carrying device and said temperature measurement point, determining the thermal conductivity between said heat producing portion of said electrical current carrying device and said temperature measurement point, and combining said first and second signals with said thermal conductivity to produce a third signal relating to the temperature of said heat producing portion of said electrical current carrying device.

2. A method for monitoring the temperature of the heat producing portion of an electrical current carrying device with a plurality of thermal dissipation paths comprising the steps, producing a signal relating to the temperature at one point along each thermal dissipation path associated with said electrical current carrying device, determining the thermal conductivity between said heat producing portion of said electrical current carrying device and each temperature measurement point, producing a signal relating to the total power dissipated by the electrical current carrying device as heat, and combining said signals relating to temperature, said thermal conductivities, and said power measurement to produce a signal relating to the temperature of said heat producing portion of said electrical current carrying device.

3. The method of claim 1 or 2 wherein the electrical current carrying device is a semiconductor nand the heat producing portion of the electrical current carrying device is a semiconductor junction.

4. The method of claim 1 wherein the second signal is directly measured by a heat flux sensor which is thermally in series on the thermal dissipation path whereby the measured heat flux travels through the sensor.

5. The method of claim 1 wherein the second signal is directly measured by a heat flux sensor which is thermally parallel to a thermal dissipation path whereby the majority of the measured heat flux does not travel through the sensor.

6. The method of claim 5 wherein the heat flux sensor is accomplished by measuring temperatures at a plurality of points along the direction of heat flux.

7. The method of claim 1 wherein the second signal is calculated by determining the sum of the heat flux along a plurality of thermal dissipation paths.

8. The method of claim 1 or 2 wherein the thermal conductivity is calculated by the steps, monitoring the power delivered to the electrical current carrying device over time, monitoring the temperature at a point along a thermal dissipation path over time, determining the specific heat and density of the materials between the temperature measurement point and the electrical current carrying device, and solving for the thermal conductivity, k, in the equation $$\delta T/\delta t = (k/\rho c_p)*(\delta^2 T/\delta x^2) + (\delta q/\delta t)/\rho c_p.$$

9. The method of claim 1 or 2 wherein the thermal conductivity is calculated by the steps, monitoring the power delivered to the electrical current carrying device over time, monitoring the temperature at a point along a thermal dissipation path over time, determining the specific heat and density of the materials between the temperature measurement point, and the electrical current carrying device, solving for the thermal conductivity, k, by treating the problem as an Inverse Heat Conduction Problem.

10. The method of claim 1 or 2 wherein the thermal conductivity of a thermal dissipation path containing a plurality of elements is determined by weighted averaging of the known thermal conductivities of the constituents of the thermal dissipation path.

11. The method of claim 1 or 2 and including the step of utilizing the temperature of said heat producing portion of said electrical current carrying device to regulate the temperature of the electrical current carrying device.

12. The method of claim 1 or 2 and including the step of utilizing the temperature of said heat producing portion of said electrical current carrying device as an alert to the temperature status of the electrical current carrying device.

13. The method of claim 11 wherein the regulation of the electrical current carrying device is achieved by altering the power delivered to the electrical current carrying device.

14. The method of claim 11 wherein the regulation of the electrical current carrying device is achieved by altering the efficiency of the electrical current carrying device.

15. The method of claim 11 wherein the regulation of the electrical current carrying device is achieved by altering the efficiency of the thermal dissipation means.

16. The method of claim 11 wherein the regulation of the electrical current carrying device is achieved by controlling a distinct temperature controlling unit that is thermally connected to the electrical current carrying device.

17. An apparatus for monitoring the temperature of the heat producing portion of an electrical current carrying device comprising, means for establishing a temperature at one point along a thermal dissipation path associated with said electrical current carrying device, means for determining the heat flux between the heat producing portion of said electrical current carrying device and said temperature measurement point, means for determining the thermal conductivity between said heat producing portion of said electrical current carrying device and said temperature measurement point, and means for calculating the temperature of said heat producing portion of said electrical current carrying device based upon said temperature on the thermal dissipation path, said heat flux, and said thermal conductivity, wherein said heat flux is determined by measuring any two values chosen from the group consisting of the current flowing through the device, the electrical impedance of the device, and the voltage across the device.

18. An apparatus for monitoring the temperature of the heat producing portion of an electrical current carrying device comprising, means for establishing a temperature at one point along a thermal dissipation path associated with said electrical current carrying device, means for determining the heat flux between the heat producing portion of said electrical current carrying device and said temperature measurement point, means for determining the thermal conductivity between said heat producing portion of said electrical current carrying device and said temperature measurement point, and means for calculating the temperature of said heat producing portion of said electrical current carrying device based upon said temperature on the thermal dissipation path, said heat flux, and said thermal conductivity, wherein the heat flux is measured utilizing a heat flow sensor comprising a first integrating temperature sensing means, a second integrating temperature sensing means that is offset by a known distance from the first in the direction of heat flow, and a means to mount such sensor to a thermal dissipation path.

19. An apparatus according to claim 18 where the temperature sensing means are differential thermopiles that are mounted in close proximity to each other thereby creating a thermally serial sensor in which the heat flows through its thickness.

20. An apparatus according to claim 18 where the temperature sensing means surround and are thermally parallel to the thermal dissipation path thereby creating a sensor in which there is minimal heat flow.

21. An apparatus according to claim 18 where the temperature sensing means span a portion of the thermal dissipation path and are thermally parallel to the thermal dissipation path thereby creating a sensor in which there is minimal heat flow.

22. An apparatus according to claim 18 wherein the heat flow sensor comprises a plurality of distinct heat flow sensors placed at a known distance to each other relative to the direction of heat flux.

23. An apparatus according to claim 18 wherein the heat flow sensor comprises a single device, and wherein the first and second temperature sensing means comprise a plurality of temperature sensing locations at known distances to each other relative to the direction of heat flux.

24. An apparatus for monitoring the temperature of the heat producing portion of an electrical current carrying device containing a plurality of thermal dissipation paths comprising, means for establishing a temperature at one point along each thermal dissipation path associated with said electrical current carrying device, means for determining the thermal conductivity between said heat producing portion of said electrical current carrying device and each temperature measurement point, means for determining the total power dissipated by the electrical current carrying device as heat, and means for calculating the temperature of said heat producing portion of said electrical current carrying device based upon said thermal path temperature measurements, said thermal conductivities, and said power measurement.

* * * * *